United States Patent
Lamorlette et al.

[11] Patent Number: 5,992,832
[45] Date of Patent: Nov. 30, 1999

[54] SPHERE, IN PARTICULAR A PNEUMATIC SPHERE, FOR EXAMPLE FOR AUTOMOTIVE HYDROPNEUMATIC SUSPENSIONS

[75] Inventors: Bruno Lamorlette, Houilles; Alain Tranzer, Chatenay Malabry, both of France

[73] Assignees: Automobiles Peugeot, Paris, France; Automobiles Citroen, Neuilly Sur Seine, France

[21] Appl. No.: 08/754,966

[22] Filed: Nov. 22, 1996

[30] Foreign Application Priority Data

Nov. 30, 1995 [FR] France .................................. 95 14180

[51] Int. Cl.⁶ ................................. F16F 9/04; F16L 11/00
[52] U.S. Cl. .......................................... 267/64.27; 138/30
[58] Field of Search ..................... 188/298, 314, 188/315; 267/64.23, 64.27, 64.28; 303/87, DIG. 11; 220/720–723; 138/36; 280/708; 92/99

[56] References Cited

U.S. PATENT DOCUMENTS

| | | | |
|---|---|---|---|
| 3,220,594 | 11/1965 | Ortheil et al. | 138/30 |
| 3,397,719 | 8/1968 | Ortheil | 138/30 |
| 3,477,473 | 11/1969 | Biabaud | 138/30 |
| 3,788,627 | 1/1974 | Wieland . | |
| 3,825,034 | 7/1974 | Chouings | 138/30 |
| 4,049,251 | 9/1977 | Masae . | |
| 4,092,017 | 5/1978 | Urushiyama et al. . | |
| 4,117,866 | 10/1978 | Bohm et al. | 138/30 |
| 4,252,151 | 2/1981 | Haug et al. | 138/30 |
| 4,335,751 | 6/1982 | Sugimura et al. | 138/30 |
| 4,543,997 | 10/1985 | Kishimoto | 138/30 |
| 5,117,873 | 6/1992 | Miyakawa et al. | 138/30 |

FOREIGN PATENT DOCUMENTS

| | | |
|---|---|---|
| 0095552 A3 | 12/1983 | European Pat. Off. . |
| 0124414 A1 | 11/1984 | European Pat. Off. . |
| 0435834 A1 | 7/1991 | European Pat. Off. . |
| 1265241 | 4/1902 | France . |
| 1562181 | 4/1969 | France . |
| 1206666 | 12/1965 | Germany . |
| 3267754 | 9/1983 | Germany ................... 188/314 |

*Primary Examiner*—Chris Schwartz
*Attorney, Agent, or Firm*—Pollock, Vande Sande & Amernick

[57] ABSTRACT

A sphere, in particular a pneumatic sphere, which comprises a rigid jacket (11) having an upper portion (11a, 21a) and a lower portion (11b) and a pliable, deformable membrane (2) arranged inside this jacket in such a way as to delimit an upper chamber (3) and a lower chamber (4), the membrane being attached in the area of junction (11c) between the upper and lower portions and being movable between an extreme lowered position and an extreme raised position. The jacket has a flattened overall shape and, in the extreme raised position, the membrane substantially coincides with the inner surface of the upper portion (11a, 21a) of the jacket.

13 Claims, 4 Drawing Sheets

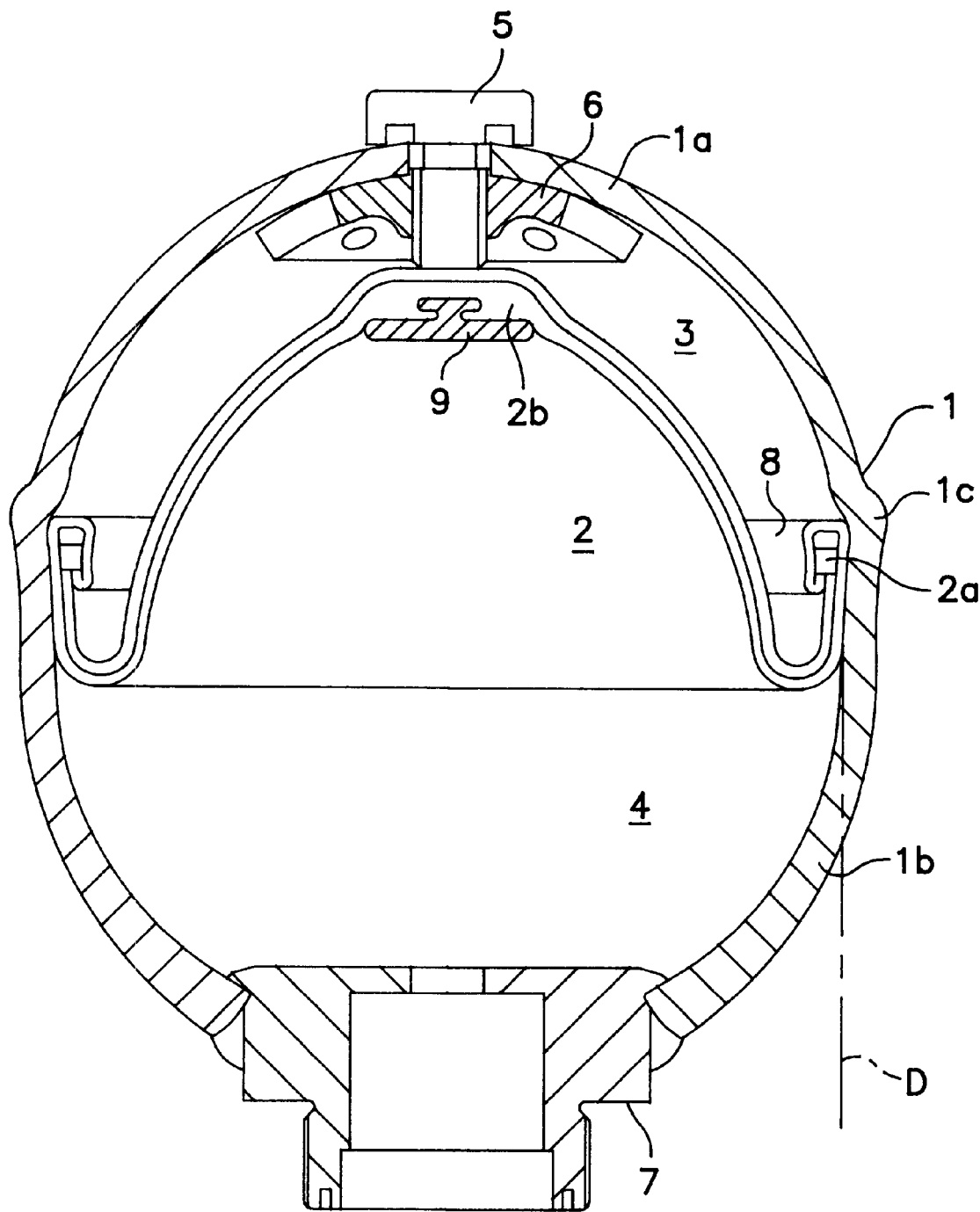
FIG. IA
PRIOR ART

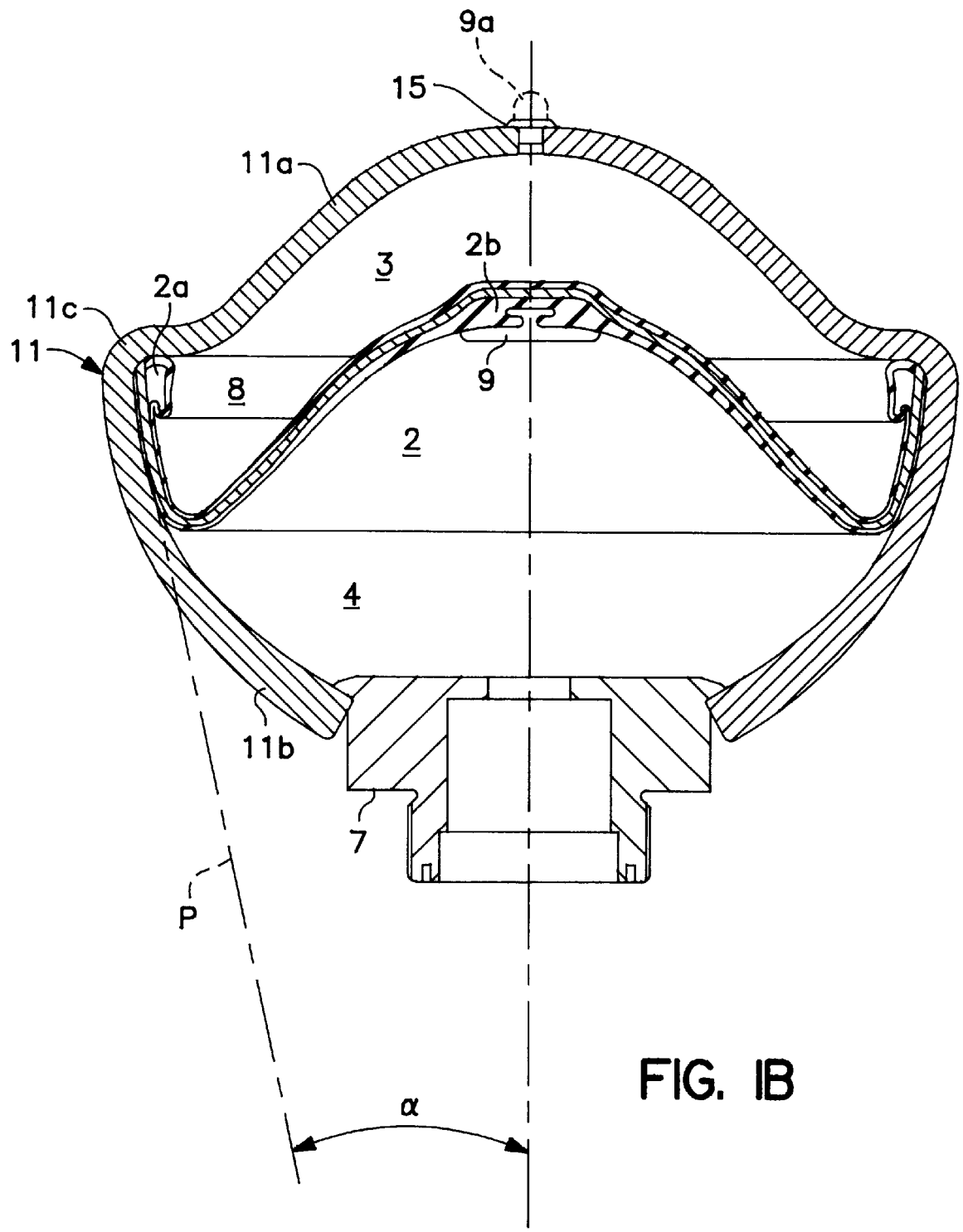
FIG. IB

SPHERE, IN PARTICULAR A PNEUMATIC SPHERE, FOR EXAMPLE FOR AUTOMOTIVE HYDROPNEUMATIC SUSPENSIONS

FIELD OF THE INVENTION

The present invention concerns a pneumatic sphere used, for example, in an automotive hydropneumatic suspension.

BACKGROUND OF THE INVENTION

A prior art hydropneumatic sphere is shown in axial cross-section in FIG. 1A.

This prior art sphere comprises a rigid outer jacket 1, for example one made of metal, having an upper portion 1a and a lower portion 1b which are welded together or formed as one piece, and a pliable deformable membrane 2 fastened inside said jacket in the area of junction 1c between these upper and lower portions, so as to delimit an upper chamber 3, which encloses a gas, for example, and a lower chamber 4 designed to contain a fluid, for example a liquid.

The upper chamber 3 is intended to contain a pressurized gas injected through an inflation screw 5 set in the top of the jacket 1, which is screwed into a position-retention element 6 in the form of a spherical cap housed inside the upper portion 1a of the jacket 1.

The lower chamber 4 connects, for example, with a hydraulic circuit (not shown) by means of a connection end piece 7.

The membrane can be shifted inside the jacket 1 between an extreme lowered position, in which it is in contact with the connection end piece 7, and an extreme raised position, in which it comes into contact with the inflation screw 5.

In the extreme lowered position, the membrane 2 is generally hemispherical in shape, and the equatorial peripheral edge 2a incorporates a radially- and inwardly-projecting bulge which grips a circular collar 8 in the aforementioned area of junction 1c, in order to secure attachment of the membrane thereto.

The membrane 2 is attached to the collar 8 in such a way that, in the lowered position, it extends locally from the area of junction 1c in a direction D parallel to the axis A of the sphere.

The membrane 2 is thicker in its central area 2b, in which is embedded an attachment stub 9a made integral with a disk-shaped plate 9, which is attached beneath this stiffened central area and designed to come into contact with the connection end piece 7 in the extreme lowered position.

This type of sphere is already in use as a replacement for the spring of a MacPherson suspension, the fluid used to actuate the suspension thrustor establishing a fluid connection with the lower portion of the sphere, so that, when the car body is depressed, the fluid is pushed back into the lower chamber 4, thereby compressing the gas enclosed in the upper chamber 3 on the other side of the membrane 2, the expansion of the gas compressed in this way ensuring the return of the fluid into the hydraulic circuit of the suspension when the vehicle wheels undergo spring movement.

In this conventional type of sphere, the membrane is subjected to strong mechanical stresses during its motion between the lowered and raised positions and undergoes repeated tractive stresses, with the result that the membrane can gradually become cracked and lose fluid-tightness, and that it becomes necessary to reinflate periodically the upper chamber of the sphere.

Furthermore, during the shift from the lowered to the raised position, the curvature of the membrane varies greatly, thus causing a so-called "blistering" phenomenon.

FIG. 1A shows, moreover, that in the extreme raised position of the membrane 2, a sizeable non-functional volume persists in the upper chamber.

SUMMARY OF THE INVENTION

The invention is intended to avoid the aforementioned problems and to propose a sphere, in particular a pneumatic sphere, used in automotive hydropneumatic suspensions, for example, and which makes it possible to reduce tractive stresses and blistering in the membrane.

To this end, the present invention concerns a pneumatic sphere, comprising a rigid jacket incorporating upper and lower portions, and a pliable, deformable membrane arranged inside the jacket so as to delimit an upper and a lower chamber, the membrane being fastened in the area of junction between the upper and lower portions and capable of shifting between an extreme lowered position and an extreme raised position, wherein the jacket has an overall flattened shape in order to prevent blistering of the membrane during its movements.

According to a special feature of the invention, the jacket may comprise means ensuring that, in the extreme raised position, the membrane coincides substantially with the inner surface of the upper portion of the jacket, in order to reduce to the maximum possible extent the unused volume and, therefore, to minimize tractive stresses in the membrane.

Advantageously, the overall flattened shape of the jacket is characterized by a ratio between the inner diameter in the area of junction of the upper and lower potions of the jacket and its interior height of between 1.35 and 1.65, and preferably 1.5.

According to another feature of the invention, the ratio between the interior height of the jacket and the interior height of the upper portion thereof ranges between 2.25 and 2.75, and is preferably about 2.5.

In a first embodiment of the invention, the aforementioned means consist of the wall itself of the upper portion of the jacket, which, in proximity to the aforementioned area of junction, incorporates a curvature which is the opposite of the curvature of the top of the sphere, in order to eliminate the unused volume in the upper chamber, in particular above the area of attachment of the membrane to the jacket.

Provision may also be made to ensure that the unrolled length is equal to, or slightly greater than, the length of the inner surface of the lower portion of the jacket, to prevent the membrane from functioning under traction in the extreme lowered position.

According to yet another feature of the invention, the plane tangent to the inner surface of the lower portion of the jacket in proximity to the area of junction with the upper portion forms an angle with the axis of the sphere of between 5 and 8°, and preferably of about 7°.

These two latter features help to ensure that the membrane rests on the lower interior portion of the jacket without being subjected to tractive stress, when it is in the extreme lowered position.

In another embodiment of the invention, the upper portion of the jacket has the overall shape of a spherical cap, and the aforementioned means are constituted by a rigid annular insert used simultaneously to attach the peripheral edge of the membrane to the jacket and to reduce the unused volume in the upper chamber, in particular above the area of attachment.

In the latter embodiment, the rigid annular insert reforms, inside the upper pneumatic chamber, a curvature opposite to the curvature of the top of the first embodiment of the sphere.

The upper chamber is more especially designed to hold a pressurized gas, and it is sealed by a permanently positioned element, such as a welded ball. In fact, since the membrane is subjected to lesser mechanical stresses in the sphere according to the invention, the risks of cracking are considerably reduced, so that it is superfluous to consider the possibility of reinflating the sphere.

BRIEF DESCRIPTION OF THE DRAWINGS

The invention will be better understood and other goals, features, details, and advantages thereof will emerge with enhanced clarity during the following explanatory description of two specific, preferred embodiments provided solely by way of example and with reference to the attached schematic drawings, in which:

FIG. 1A is an axial cross-section of a conventional sphere, with the membrane in the extreme raised position, while FIG. 1B is an axial cross-section of a first embodiment of the sphere according to the invention, with the membrane in an intermediate raised position; and FIG. 2A is an axial cross section of another embodiment of the sphere according to the invention, with the membrane in the extreme lowered position, while

DESCRIPTION OF PREFERRED EMBODIMENTS

Figure 2A:
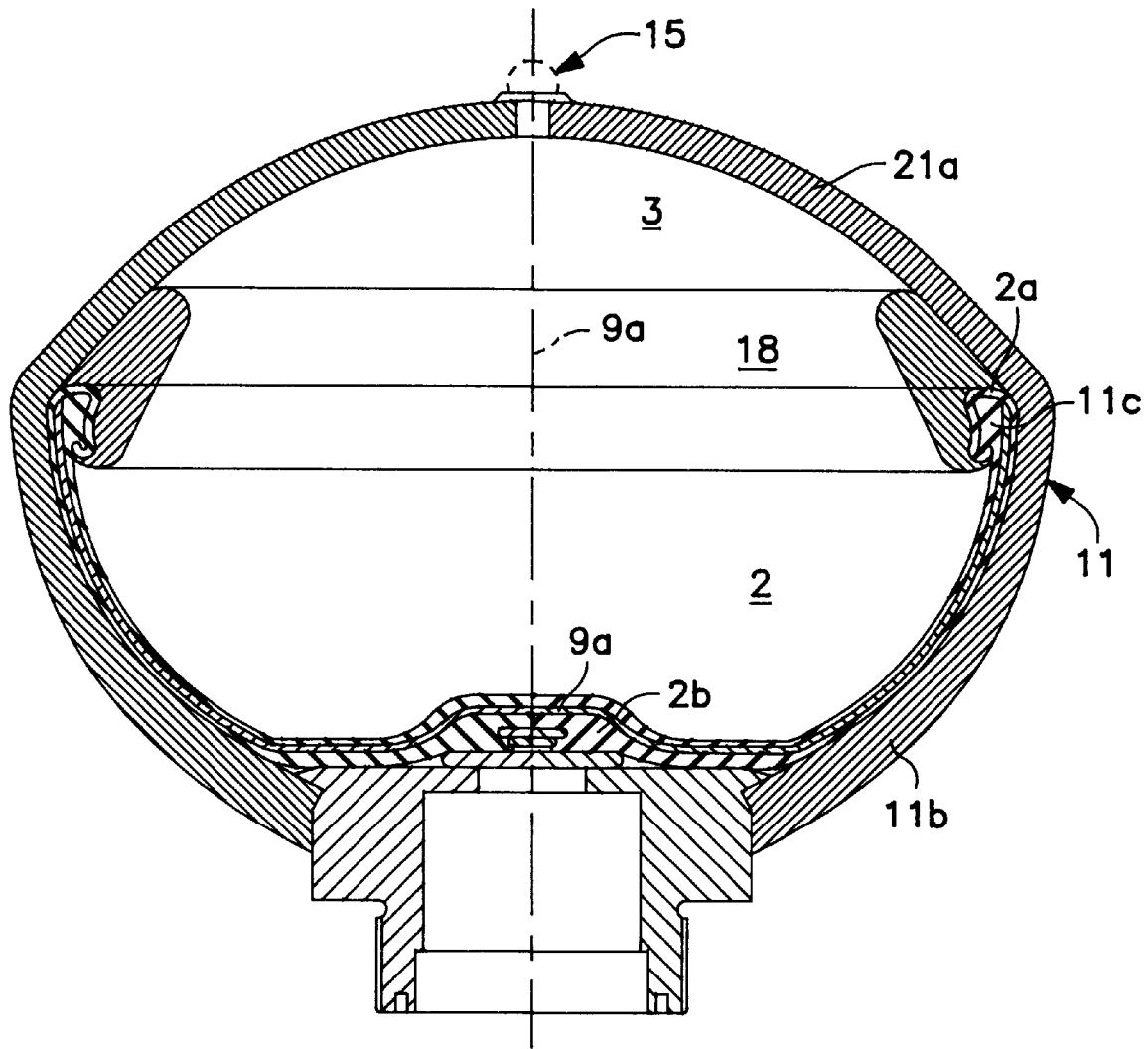
Figure 2B:
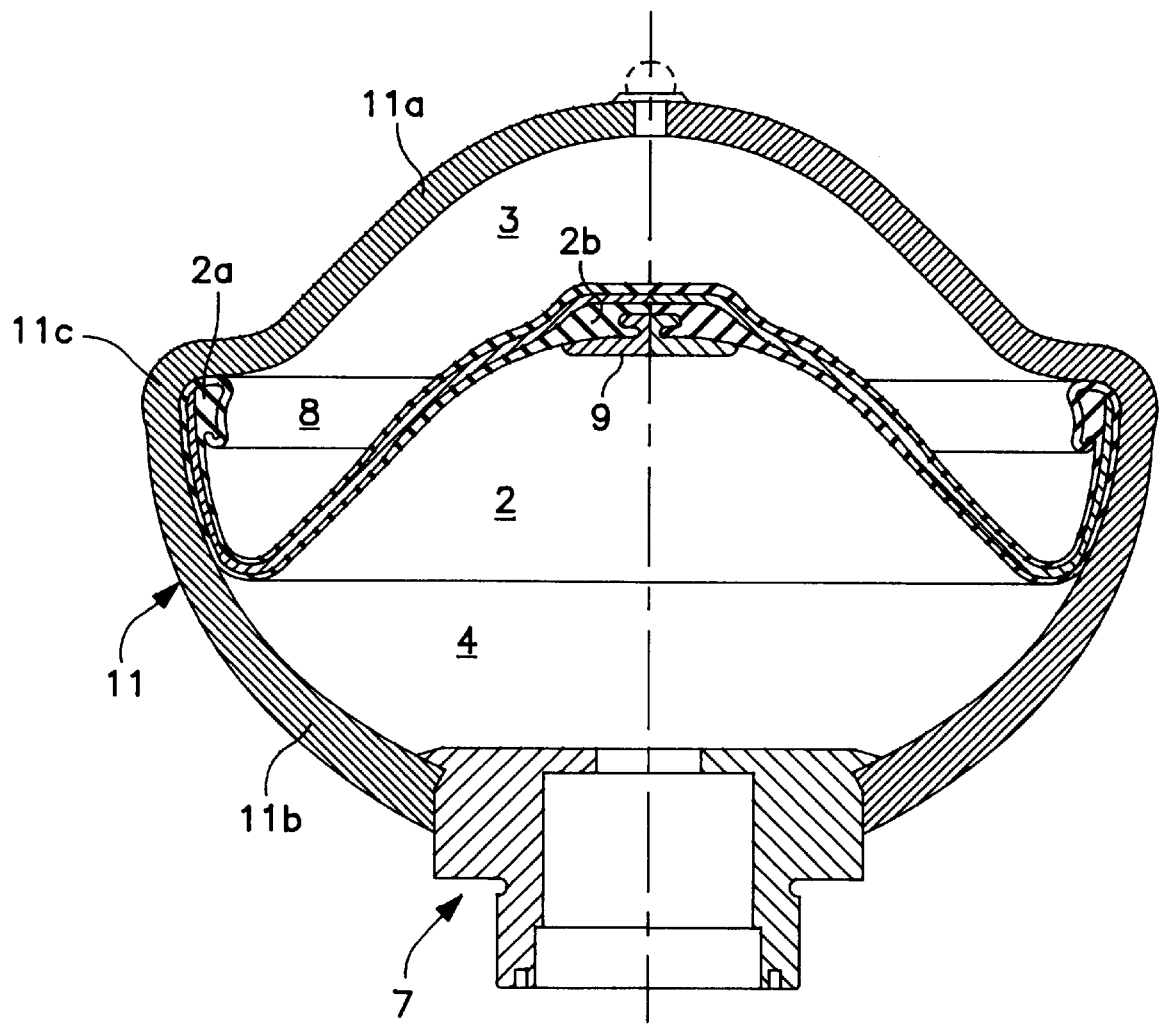
FIG. 2B is an axial cross-section of the sphere according to the invention, with the membrane in the intermediate raised position.

According to the embodiment shown in FIGS. 1B and 2B, the sphere according to the invention comprises, with respect to a first embodiment, an outer jacket 11, for example a metal jacket, having a substantially flattened overall shape.

The jacket 11 comprises an upper portion 11a and a lower portion 11b separated by a junction area 11c.

The lower portion 11b has a substantially hemispherical shape tapered at its base to allow attachment of the connection end piece 7.

It will be noted that the lower portion 11b is not a complete hemisphere, since the plane P locally tangent to the internal surface of the lower portion 11b beginning at the junction area 11c forms an angle α with the axis A of the sphere according to the invention.

The upper portion 11a has a generally convex curvature, given that it incorporates, at its center, a curvature oriented toward the inside of the sphere and, in proximity to the junction area 11c, a concave curvature oriented toward the outside of the sphere.

It can be clearly seen in FIGS. 1B and 2B that the upper portion 11a of the jacket 11 forms, when seen in axial cross-section, an S-shaped line which fills the unused volume located above the attachment collar 8.

Since the membrane 2 is, at this spot, subjected to weaker stresses and reduced blistering, there is no risk that it will crack and thus lose its fluid-tightness, so that the inflation screw 5 mentioned above can be removed. In this case, the top of the sphere is sealed by a non-detachable element, for example a welded ball 15.

The membranes used are normally of the multi-layer type, for example comprising two layers of rubber surrounding a layer of polyvinyl alcohol.

FIG. 2A illustrates another embodiment of the sphere according to the invention.

This second embodiment differs from the first mainly because of the upper portion 21a of the jacket 11.

In fact, the upper portion 21a here has a convex shape, whose curvature is oriented toward the inside of the sphere.

The circular collar 8 is here replaced by a rigid annular insert 18, for example one made of plastic.

The annular insert 18 is shaped in such a way as to hold the peripheral edge 2a of the membrane 2 against the inner surface of the jacket 11 and fills the non-functional volume located mainly above the peripheral edge 2a.

This second embodiment proves especially advantageous during manufacture, since only a single stamping tool is required to manufacture the jacket, the different desired shapes being produced by simply changing the size of the insert.

It is also possible, within the scope of the invention, to functionally reverse the upper portions 11a, 21a, and the lower portion 11b.

The letters L, H, and Ha are used to reference, respectively, the inner diameter of the sphere in the junction area, the interior height of the sphere, and the interior height of the upper portion.

It can be clearly seen in FIGS. 1B and 2B that the membrane 2 incorporates a lesser thickness in its intermediate portion between its central area 2b and its peripheral edge 2a.

For purposes of simplicity, the different parts of the sphere have been termed "upper" or "lower," but the sphere can be configured in any manner whatever, for example in an inclined, horizontal, or head-down arrangement.

What is claimed is:

1. A sphere comprising a rigid jacket (11) having an upper portion (11a, 21a) adapted to be filled with pressurized gas and a lower portion (11b) in communication with an hydraulic circuit, and a pliable, deformable membrane (2) arranged inside said jacket so as to delimit an upper chamber (3) and a lower chamber (4), said membrane being attached in a junction area (11c) between said upper and lower portions and being movable between (a) an extreme lowered position in which said membrane most closely approaches said lower portion, and (b) an extreme raised position in which said membrane most closely approaches said upper portion, as a result of an increase in fluid pressure from said hydraulic circuit, wherein at least said upper portion of said jacket (11) has a flattened overall shape, and said jacket comprises means to ensure that, in the extreme raised position, said membrane substantially coincides with an inner surface of said upper portion (11a, 21a) of said jacket, so as to reduce unused volume in said upper chamber to a maximum possible extent and, accordingly, to reduce blistering of said membrane and to minimize deformations thereof.

2. The sphere according to claim 1, wherein a ratio between an inner diameter (L) of said jacket in said junction area and an interior height (H) of said jacket ranges between 1.35 and 1.65.

3. The sphere according to claim 2, wherein said ratio is 1.5.

4. The sphere according to claim 1, wherein a ratio between an interior height (H) of said jacket and an interior height (Ha) of said upper portion (11a, 21a) of said jacket ranges between 2.25 and 2.75.

5. The sphere according to claim 4, wherein said ratio is about 2.5.

6. The sphere according to claim 1, wherein a plane (P) tangent to an inner surface of said lower portion (11b) of said jacket (11) adjacent to said junction area (11c) with said upper portion (11a, 21a) forms an angle of 5 to 8° with an axis (A) of said sphere.

7. The sphere according to claim 6, wherein said angle is 7°.

8. The sphere according to claim 1, wherein said upper chamber (3) contains a gas under pressure and is obturated by a non-detachable element (15).

9. The sphere according to claim 8, wherein said non-detachable element is a welded ball.

10. The sphere according to claim 1, wherein a top of said sphere has a general convex curvature, and wherein said means are constituted by a wall of said upper portion (11a) of said jacket (11), which, in proximity to said junction area (11c), incorporates a concave curvature opposite to the curvature of said top of said sphere, in order to eliminate said unused volume in said upper chamber (3).

11. The sphere according to claim 1, wherein said upper portion (21a) of said jacket (11) has a generally dome shape, and said means are constituted by a rigid annular insert (18) which both fixes a peripheral edge (2a) of said membrane on said jacket and reduces said unused volume in said upper chamber (3).

12. The sphere according to claim 1, wherein a length of said membrane when unrolled is at least equal to a length of an inner surface of said lower portion (11b) of said jacket (11).

13. The sphere according to claim 1, wherein the intermediate part of said membrane (2) between a central area (2b) and a peripheral edge (2a) of said membrane has a reduced thickness.

* * * * *